US006448939B2

(12) United States Patent
Maruta

(10) Patent No.: US 6,448,939 B2
(45) Date of Patent: Sep. 10, 2002

(54) ARRAY ANTENNA RECEIVING APPARATUS

(75) Inventor: Yasushi Maruta, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/797,807

(22) Filed: Mar. 5, 2001

(30) Foreign Application Priority Data

Mar. 7, 2000 (JP) ....................................... 2000-062234

(51) Int. Cl.7 .................................................. G01S 3/16
(52) U.S. Cl. ....................................... 343/853; 342/380
(58) Field of Search ................................ 342/378, 371, 342/380, 373, 357; 375/130; 370/330; 343/853, 893

(56) References Cited

U.S. PATENT DOCUMENTS 5,619,503 A * 4/1997 Dent .......................... 370/330
5,929,811 A * 7/1999 Rilling ....................... 342/380

FOREIGN PATENT DOCUMENTS

JP 11-46180 2/1999

* cited by examiner

*Primary Examiner*—Don Wong
*Assistant Examiner*—James Clinger
(74) *Attorney, Agent, or Firm*—Sughrue Mion, PLLC

(57) ABSTRACT

Calibration signals which were generated in a signal generator 107 for calibration and to which frequency conversion was applied in a radio transmitting section 108 for calibration are made to be power levels in power level variable circuits 109-1 to 109-N so that power levels of calibration signals extracted in a signal processing section 106 for calibration become constant, and are multiplied by signals received at antenna elements 102-1 to 102-N in multiplex circuits 103-1 to 103-N.

18 Claims, 6 Drawing Sheets

ARRAY ANTENNA RECEIVING APPARATUS

BACKGROUND OF THE INVENTION

The present inventions relates to an array antenna receiving apparatus for removing interference by controlling directivity of an antenna, and especially, to an array antenna receiving apparatus for conducting calibration of a plurality of radio receiving sections.

In a cellar mobile communication system and so forth, in order to aim at high speed and high quality of a signal, and increase of a capacity of members, a method of forming a reception directivity pattern has been investigated, in which, using an array antenna receiving apparatus consisting of a plurality of antenna elements, a reception gain is increased for a direction along which a desired signal comes, and a reception gain is decreased for interference from other users and interference due to a delay wave.

By the way, in the array antenna receiving apparatus, since generally an amplitude variation and a phase variation in a radio receiving section for each antenna element are individually different from each other, it is necessary to compensate those amplitude variation and phase variation in forming the reception directivity pattern. This operation called calibration.

In the array antenna receiving apparatus for conducting this kind of calibration, for example like a calibration device in an array antenna radio receiving apparatus disclosed in JP-A-46180/1999, amplitude and phase information for compensation is obtained by inputting known calibration signals to each radio receiving section and measuring an amplitude variation and a phase variation.

FIG. 6 is a block diagram showing one arrangement example of a conventional array antenna receiving apparatus for conducting calibration.

As shown in FIG. 6, this conventional example is constructed of an array antenna 601 consisting of a plurality of antenna elements 602-1 to 602-N, multiplex circuits 603-1 to 603-N for multiplying calibration signals by signals received at the antenna elements 602-1 to 602-N and outputting them, which are provided in accordance with the antenna elements 602-1 to 602-N, respectively, radio receiving sections 604-1 to 604-N for conducting reception processing of signals output from the multiplex circuits 603-1 to 603-N, which are provided in accordance with the antenna elements 602-1 to 602-N, respectively, a detection circuit 611 to which signals output from the radio receiving sections 604-1 to 604-N are input, for detecting amplitude information and phase information of the signals received at the antenna elements 602-1 to 602-N based on the input signals, user signal processing sections 605-1 to 605-M, provided by the number of users, for correcting the signals output from the radio receiving sections 604-1 to 604-N using the amplitude information and phase information detected at the detection circuit 611, and outputting them as demodulation signals for every user, a signal generator 607 for calibration, which generates calibration signals, a radio transmitting section 608 for calibration, which applies frequency conversion to the calibration signals generated at the signal generator 607 for calibration, and outputting them, and power level variable circuit 609 for outputting the calibration signals output from the radio transmitting section 608 for calibration at arbitrary power levels, and the calibration signals output from the power level variable circuit 609 are multiplied by the signals received at the antenna elements 602-1 to 602-N in the multiplex circuits 603-1 to 603-N.

In the antenna elements 602-1 to 602-N constituting the array antenna 601, restrictions are not especially imposed on directivity within a horizontal plane and a perpendicular plane for a single antenna element, and for example, omini (non-directivity) and dipole (dipole directivity) can be given. The antenna elements 602-1 to 602-N are placed so that reception signals of the respective antenna elements 602-1 to 602-N have a correlation with each other, and receive signals in which desired signals and a plurality of interference signals are multiplied.

In the multiplex circuits 603-1 to 603-N, the calibration signals output from the power level variable circuit 609 are multiplied by the signals received at the antenna elements 602-1 to 602-N in a radio band by means of code multiplexing and so forth for example, and are output to the radio receiving sections 604-1 to 604-N. In addition, a multiplexing method here is not limited to the code multiplexing. Also, the calibration signals multiplied at the multiplex circuits 603-1 to 603-N can be extracted.

The radio receiving sections 604-1 to 604-N are constructed of a low-noise amplifier, a band-limitation filter, a mixer, a local dial device, an AGC (Auto Gain Controller), a quadrature detector, a low band pass filter, an analog/digital converter and so forth. Here, in the radio receiving section 604-N for example, a signal output from the multiplex circuit 603-N is input thereto, and amplification, frequency conversion from a radio band to a base band, quadrature detection, analog/digital conversion and so forth of the input signal are conducted, and the signal is output to the user signal processing sections 605-1 to 605-M and the detection circuit 611. Generally, to make power levels of output signals constant independent of power levels of input signals for each of the radio receiving sections 604-1 to 604-N, an AGC that is a non-linear circuit is used.

In the detection circuit 611, signals output from the radio receiving sections 604-1 to 604-N are input thereto, and calibration signals are extracted from the input signals, and thereby, amplitude and phase information of the signals received at the antenna elements 602-1 to 602-N is detected. The detected amplitude and phase information is output to the signal processing sections 605-1 to 605-M. Here, the amplitude and phase information of the signals received at the antenna elements 602-1 to 602-N is detected by investigating variation quantity of amplitude and phase of the calibration signals in the radio receiving sections 604-1 to 604-N.

In the user signal processing sections 605-1 to 605-M, the signals output from the radio receiving sections 604-1 to 604-N and the amplitude and phase information detected at the detection circuit 611 are input thereto, and the signals output from the radio receiving sections 604-1 to 604-N are corrected based on the amplitude and phase information detected at the detection circuit 611, and thereby, a reception directivity pattern is formed such that, for each user, a reception gain is increased for a direction along which a user signal comes, and a reception gain is decreased for interference from other users and interference due to a delay wave, and demodulation signals received by means of the reception directivity pattern are output.

In the signal generator 607 for calibration, calibration signals are generated in a base band, and the generated calibration signals are output to the radio transmitting section 608 for calibration.

In the radio transmitting section 608 for calibration, the calibration signals in the base band, which were output from the signal generator 607 for calibration, are input thereto, and digital/analog conversion, frequency conversion from a base band to a radio band and so forth are applied to the input calibration signals, and these calibration signals are output to the power level variable circuit 609 as calibration signals having a frequency band same as the signals received at the antenna elements 602-1 to 602-N.

In the power level variable circuit 609, the calibration signals output from the radio transmitting section 608 for calibration are output to the multiplex circuits 603-1 to 603-N at arbitrary power levels.

Below, an operation of the array antenna receiving apparatus arranged as described above will be explained.

In each signal received at the antenna elements 602-1 to 602-N, a desired (user) signal component and an interference signal component, and a thermal noise are included. Further, multi-path components are included in the desired signal component and the interference signal component, respectively. Usually, those signal components come from directions different from each other.

In the array antenna receiving apparatus shown in FIG. 6, using the amplitude and phase information of each signal received at the antenna elements 602-1 to 602-N, the respective signal components which come from directions different from each other are distinguished from each other, and a reception directivity pattern is formed.

At that time, in case that an amplitude and phase of reception signals inside the radio receiving sections 604-1 to 604-N are changed by each circuit included in the radio receiving sections 604-1 to 604-N, information different from the amplitude and phase information of each signal received at the original antenna elements 602-1 to 602-N is provided to the user signal processing sections 605-1 to 605-M, and it becomes impossible to exactly distinguish the signal components from each other, and to form a reception directivity pattern.

Accordingly, the calibration signals having a frequency band same as the signals received at the antenna elements 602-1 to 602-N are multiplied by the reception signals, and in the detection circuit 611, the calibration signals are extracted from the signals output from the radio receiving sections 604-1 to 604-N, and amplitude and phase information of the reception signals is detected based on a variation of the amplitude and phase of those calibration signals, and thereby, correction is applied to the amplitude and phase information of the reception signals input to the user signal processing sections 605-1 to 605-M.

Also, in non-linear controllers (especially in AGCs) included in the radio receiving sections 604-1 to 604-N, since manners of a variation of the amplitude and phase of the reception signals are different from each other dependent on power levels of the reception signals, the calibration signals of the respective outputs from the radio receiving sections 604-1 to 604-N are extracted while power levels of the calibration signals are changed by means of the power level variable circuit 609, amplitude and phase information of the reception signals is detected based on a variation of the amplitude and phase of those calibration signals, and thereby, correction quantity to be applied to the amplitude and phase information of the reception signals input to the user signal processing sections 605-1 to 605-M is determined for every power level of each calibration signal.

In the array antenna receiving apparatus having such calibration means, even though the amplitude and phase of the reception signals are changed inside the radio receiving sections 604-1 to 604-N when the array antenna receiving apparatus works, the amplitude and phase information of the reception signals input to the user signal processing sections 605-1 to 605-M can be corrected. Also, when the apparatus does not work, calibration can be conducted with high accuracy in accordance with the power levels of the reception signals.

In this manner, in this conventional example, by using the amplitude and phase information of each signal received at the antenna elements 602-1 to 602-N, it is possible to exactly distinguish the signal components from each other, which come from directions different from each other, and to form a reception directivity pattern.

Generally, in the array antenna receiving apparatus having the plurality of antenna elements, when it works, the power levels of the reception signals are changed in time for each antenna element.

Here, in the above-mentioned conventional array antenna receiving apparatus, since an amplification rate is automatically controlled in the AGC within the radio receiving sections so that a sum of the power levels of the reception signals and the power levels of the calibration signals becomes constant, in case that the power levels of the reception signals are changed, even though the calibration signals having constant power levels are input to the radio receiving sections, the power levels of the calibration signals included in the signals output from the radio receiving sections become unfixed.

During calibration, the calibration signals input to the respective radio receiving sections are compared with the calibration signals included in the signals output from the respective radio receiving sections, and thereby, amplitude and phase variations of the calibration signals in the respective radio receiving sections are detected, and based on this detection result, amplitude and phase information of the signals received at the antenna elements 602-1 to 602-N is detected.

However, if, as mentioned above, the power levels of the calibration signals included in the signals output from the respective radio receiving sections become unfixed, it is not possible to exactly detect the amplitude and phase variations of the calibration signals in the respective radio receiving sections, and the calibration cannot be conducted with high accuracy.

SUMMARY OF THE INVENTION

The present invention is made to solve the above-mentioned problems.

An objective of the present invention is to provide an array antenna receiving apparatus capable of conducting calibration with high accuracy even in an operation.

In order to accomplish the above-described objective, an array antenna receiving apparatus of the present invention has an array antenna consisting of N (N is an integer more than or equal to 1) antenna elements, N radio receiving sections for conducting reception processing of signals received at the above-described antenna elements, calibration means for multiplying calibration signals by the signals received at the above-described antenna elements, extracting the above-described calibration signals from signals output from the above-described radio receiving sections, and detecting amplitude and phase information of the signals received at the above-described antenna elements based on the extracted calibration signals, and M (M is an integer more than or equal to 1) user signal processing sections for correcting the signals output from the above-described radio receiving sections based on the amplitude and phase information detected at the above-described calibration means, and outputting them as demodulation signals, and it is characterized in that the above-described calibration means multiplies the above-described calibration signals by the signals received at the above-described antenna elements at power levels determined based on power levels of the signals output from the above-described radio receiving sections.

Also, the above-described calibration means is characterized in that it has:

N multiplex circuits for multiplying calibration signals by the signals received at the above-described antenna elements;

a signal generator for calibration, which generates the above-described calibration signals;

a signal radio transmitting section for calibration, which applies frequency conversion to the calibration signals generated at the above-described signal generator for calibration and outputs the calibration signals having a frequency band same as a frequency of the signals received at the above-described antenna elements;

a signal processing section for calibration, which extracts the above-described calibration signals from the signals output from the above-described radio receiving sections, detects amplitude and phase information of the signals received at the above-described antenna elements based on the extracted calibration signals, and outputs control signals for controlling power levels of the above-described calibration signals based on power levels of the signals output from the above-described radio receiving sections; and N power level variable circuits for outputting the calibration signals output from the above-described signal radio transmitting section for calibration at power levels based on the control signals output from the above-described signal processing section for calibration, and the calibration signals output from the above-described power level variable circuits are multiplied by the signals received at the above-described antenna elements in the above-described multiplex circuits.

The above-described calibration means is characterized in that it has:

N multiplex circuits for multiplying calibration signals by the signals received at the above-described antenna elements;

a signal generator for calibration, which generates the above-described calibration signals;

a signal radio transmitting section for calibration, which applies frequency conversion to the calibration signals generated at the above-described signal generator for calibration and outputs the calibration signals having a frequency band same as a frequency of the signals received at the above-described antenna elements;

a signal processing section for calibration, which extracts the above-described calibration signals from the signals output from the above-described radio receiving sections, detects amplitude and phase information of the signals received at the above-described antenna elements based on the extracted calibration signals, and outputs control signals for controlling power levels of the above-described calibration signals based on power levels of the signals output from the above-described radio receiving sections;

K (K is an integer more than or equal to 1 and less than N) power level variable circuits for outputting the calibration signals output from the above-described signal radio transmitting section for calibration at power levels based on the control signals output from the above-described signal processing section for calibration; and a selection and branch circuit for selecting the calibration signals output from the above-described power level variable circuits, and distributing and outputting them to the above-described N multiplex circuits, and the calibration signals output from the above-described selection and branch circuits are multiplied by the signals received at the above-described antenna elements in the above-described multiplex circuits.

Also, the above-described signal processing section for calibration is characterized in that it outputs the control signals such that the power levels of the calibration signals extracted from the signals output from the above-described radio receiving sections becomes to be constant.

Also, the above-described signal processing section for calibration is characterized in that it recognizes a ratio of the signals output from the above-described radio receiving sections and the calibration signals extracted from the above-described signals using a bit error rate of the calibration signals extracted from the signals output from the above-described radio receiving sections.

Also, an array antenna receiving apparatus has an array antenna consisting of N (N is an integer more than or equal to 1) antenna elements, N radio receiving sections for conducting reception processing of signals received at the above-described antenna elements, calibration means for multiplying calibration signals by the signals received at the above-described antenna elements, extracting the above-described calibration signals from signals output from the above-described radio receiving sections, and detecting amplitude and phase information of the signals received at the above-described antenna elements based on the extracted calibration signals, and M (M is an integer more than or equal to 1) user signal processing sections for correcting the signals output from the above-described radio receiving sections based on the amplitude and phase information detected at the above-described calibration means, and outputting them as demodulation signals, and it is characterized in that the above-described calibration means multiplies the above-described calibration signals by the signals received at the above-described antenna elements at power levels determined based on power levels of the signals received at the above-described antenna elements.

Also, the above-described calibration means is characterized in that it has:

N multiplex circuits for multiplying calibration signals by the signals received at the above-described antenna elements;

a signal generator for calibration, which generates the above-described calibration signals;

a signal radio transmitting section for calibration, which applies frequency conversion to the calibration signals generated at the above-described signal generator for calibration and outputs the calibration signals having a frequency band same as a frequency of the signals received at the above-described antenna elements;

a signal processing section for calibration, which extracts the above-described calibration signals from the signals output from the above-described radio receiving sections, detects amplitude and phase information of the signals received at the above-described antenna elements based on the extracted calibration signals, and outputs control signals for controlling power levels of the above-described calibration signals based on power levels of the signals received at the above-described antenna elements; and N power level variable circuits for outputting the calibration signals output from the above-described signal radio transmitting section for calibration at power levels based on the control signals output from the above-described signal processing section for calibration, and the calibration signals output from the above-described power level variable circuits are multiplied by the signals received at the above-described antenna elements in the above-described multiplex circuits.

Also, the above-described calibration means is characterized in that it has:

N multiplex circuits for multiplying calibration signals by the signals received at the above-described antenna elements;

a signal generator for calibration, which generates the above-described calibration signals;

a signal radio transmitting section for calibration, which applies frequency conversion to the calibration signals generated at the above-described signal generator for calibration and outputs the calibration signals having a frequency band same as a frequency of the signals received at the above-described antenna elements;

a signal processing section for calibration, which extracts the above-described calibration signals from the signals output from the above-described radio receiving sections, detects amplitude and phase information of the signals received at the above-described antenna elements based on the extracted calibration signals, and outputs control signals for controlling power levels of the above-described calibration signals based on power levels of the signals received at the above-described antenna elements;

K (K is an integer more than or equal to 1 and less than N) power level variable circuits for outputting the calibration signals output from the above-described signal radio transmitting section for calibration at power levels based on the control signals output from the above-described signal processing section for calibration; and a selection and branch circuit for selecting the calibration signals output from the above-described power level variable circuits, and distributing and outputting them to the above-described N multiplex circuits, and the calibration signals output from the above-described selection and branch circuits are multiplied by the signals received at the above-described antenna elements in the above-described multiplex circuits.

Also, the above-described signal processing section for calibration is characterized in that it outputs the control signals such that a ratio of the power levels of the signals received at the above-described antenna elements and the power levels of the calibration signals output from the above-described power level variable circuits becomes to be constant.

Also, an array antenna receiving apparatus has an array antenna consisting of N (N is an integer more than or equal to 1) antenna elements, N radio receiving sections for conducting reception processing of signals received at the above-described antenna elements, calibration means for multiplying calibration signals by the signals received at the above-described antenna elements, extracting the above-described calibration signals from signals output from the above-described radio receiving sections, and detecting amplitude and phase information of the signals received at the above-described antenna elements based on the extracted calibration signals, and M (M is an integer more than or equal to 1) user signal processing sections for correcting the signals output from the above-described radio receiving sections based on the amplitude and phase information detected at the above-described calibration means, and outputting them as demodulation signals, and it is characterized in that the above-described calibration means has:

N multiplex circuits for multiplying calibration signals by the signals received at the above-described antenna elements;

a signal generator for calibration, which generates the above-described calibration signals;

a signal radio transmitting section for calibration, which applies frequency conversion to the calibration signals generated at the above-described signal generator for calibration and outputs the calibration signals having a frequency band same as a frequency of the signals received at the above-described antenna elements;

a signal processing section for calibration, which extracts the above-described calibration signals from the signals output from the above-described radio receiving sections, detects amplitude and phase information of the signals received at the above-described antenna elements based on the extracted calibration signals, and outputs control signals for controlling power levels of the above-described calibration signals based on power levels of the signals output from the above-described multiplex circuits; and N power level variable circuits for outputting-the calibration signals output from the above-described signal radio transmitting section for calibration at power levels based on the control signals output from the above-described signal processing section for calibration, and the calibration signals output from the above-described power level variable circuits are multiplied by the signals received at the above-described antenna elements in the above-described multiplex circuits.

Also, an array antenna receiving apparatus has an array antenna consisting of N (N is an integer more than or equal to 1) antenna elements, N radio receiving sections for conducting reception processing of signals received at the above-described antenna elements, calibration means for multiplying calibration signals by the signals received at the above-described antenna elements, extracting the above-described calibration signals from signals output from the above-described radio receiving sections, and detecting amplitude and phase information of the signals received at the above-described antenna elements based on the extracted calibration signals, and M (M is an integer more than or equal to 1) user signal processing sections for correcting the signals output from the above-described radio receiving sections based on the amplitude and phase information detected at the above-described calibration means, and outputting them as demodulation signals, and it is characterized in that the above-described calibration means has:

N multiplex circuits for multiplying calibration signals by the signals received at the above-described antenna elements;

a signal generator for calibration, which generates the above-described calibration signals;

a signal radio transmitting section for calibration, which applies frequency conversion to the calibration signals generated at the above-described signal generator for calibration and outputs the calibration signals having a frequency band same as a frequency of the signals received at the above-described antenna elements;

a signal processing section for calibration, which extracts the above-described calibration signals from the signals output from the above-described radio receiving sections, detects amplitude and phase information of the signals received at the above-described antenna elements based on the extracted calibration signals, and outputs control signals for controlling power levels of the above-described calibration signals based on power levels of the signals output from the above-described multiplex circuits;

K (K is an integer more than or equal to 1 and less than N) power level variable circuits for outputting the calibration signals output from the above-described signal radio transmitting section for calibration at power levels based on the control signals output from the above-described signal processing section for calibration; and a selection and branch circuit for selecting the calibration signals output from the above-described power level variable circuits, and distributing and outputting them to the above-described N multiplex circuits, and the calibration signals output from the above-described selection and branch circuits are multiplied by the signals received at the above-described antenna elements in the above-described multiplex circuits.

Also, the above-described signal processing section for calibration is characterized in that it outputs the control signals such that a ratio of the power levels of the signals output from the above-described multiplex circuits and the power levels of the calibration signals output from the above-described power level variable circuits becomes to be constant.

Also, the array antenna receiving apparatus is characterized in that the above-described radio receiving section comprises automatic gain controlling means for keeping power levels of output signals constant independent of power levels of input signals, and the above-described signal processing section for calibration recognizes the power levels of the signals output from the above-described multiplex circuits based on gain information in the above-described automatic gain controlling means.

In the present invention arranged as described above, since the calibration signals to be multiplied by the signals received at the antenna elements are multiplied by the signals received at the antenna elements at the power levels such that the power levels of the calibration signals extracted from the signals output from the radio receiving section become constant, even in case that the power levels of the signals received at the antenna elements change in time, and in the radio receiving sections, output thereof are automatically controlled so that a sum of the power levels of the signals received at the antenna elements and the power levels of the calibration signals become constant, the power levels of the calibration signals extracted at the calibration means do not become unfixed, and thereby, in the calibration means, the amplitude and phase variations of the calibration signals in the radio receiving section are exactly detected, and in association therewith, the amplitude and phase information of the signals received at the antenna elements is exactly detected. Thereby, calibration is conducted with high accuracy even in an operation.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
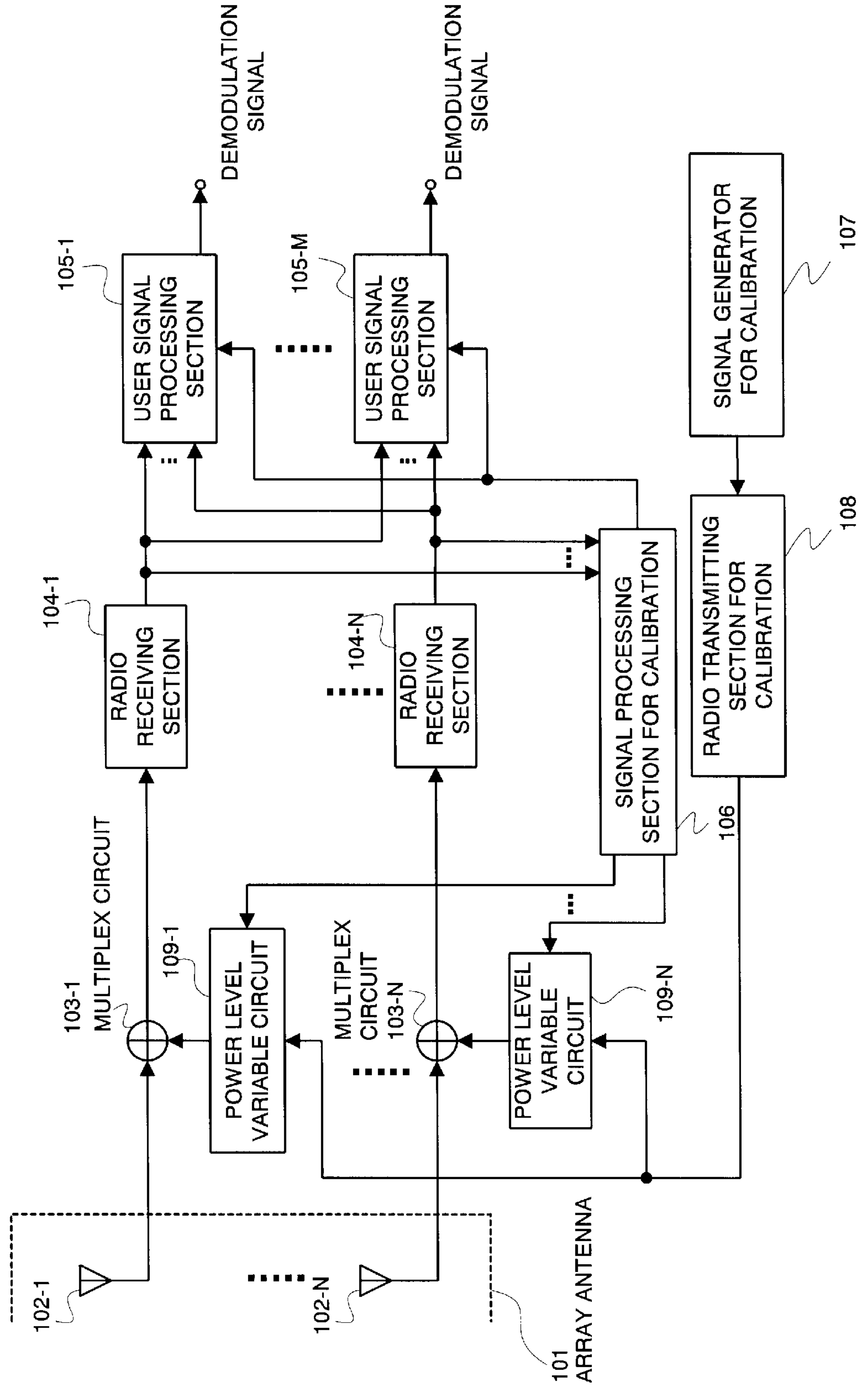
FIG. 1 is a block diagram showing the first embodiment of the array antenna receiving apparatus of the present invention.

Below, embodiments of the present invention will be explained referring to the drawings.

The First Embodiment

FIG. 1 is a block diagram showing the first embodiment of an array antenna receiving apparatus of the present invention.

As shown in FIG. 1, this embodiment is constructed of an array antenna 101 consisting of N (N is an integer more than or equal to 1) antenna elements 102-1 to 102-N, multiplex circuits 103-1 to 103-N for multiplying calibration signals by signals received at the antenna elements 102-1 to 102-N and outputting them, which are provided in accordance with the antenna elements 102-1 to 102-N, respectively, radio receiving sections 104-1 to 104-N for conducting reception processing of signals output from the multiplex circuits 103-1 to 103-N, which are provided in accordance with the antenna elements 102-1 to 102-N, respectively, a signal processing section 106 for calibration, to which signals output from the radio receiving sections 104-1 to 104-N are input, and which detects amplitude information and phase information of the signals received at the antenna elements 102-1 to 102-N based on the input signals, M (M is an integer more than or equal to 1)user signal processing sections 105-1 to 105-M, provided by the number of users, for correcting the signals output from the radio receiving sections 104-1 to 104-N using the amplitude information and phase information detected at the signal processing section 106 for calibration, and outputting them as demodulation signals for every user, a signal generator 107 for calibration, which generates calibration signals, a radio transmitting section 108 for calibration, which applies frequency conversion to the calibration signals generated at the signal generator 107 for calibration, and outputting them, and power level variable circuits 109-1 to 109-N for outputting the calibration signals output from the radio transmitting section 108 for calibration at arbitrary power levels which are controlled at the signal processing section 106 for calibration, and the calibration signals output from the power level variable circuits 109-1 to 109-N are multiplied by the signals received at the antenna elements 102-1 to 102-N in the multiplex circuits 103-1 to 103-N. In addition, calibration means is constructed of the multiplex circuits 103-1 to 103-N, the signal processing section 106 for calibration, the signal generator 107 for calibration, the radio transmitting section 108 for calibration, and the power level variable circuits 109-1 to 109-N.

In the antenna elements 102-1 to 102-N constituting the array antenna 101, restrictions are not especially imposed on directivity within a horizontal plane and a perpendicular plane for a single antenna element, and for example, omini (non-directivity) and dipole (dipole directivity) can be given. The antenna elements 102-1 to 102-N are placed so that reception signals of the respective antenna elements 102-1 to 102-N have a correlation with each other, and receive signals in which desired signals and a plurality of interference signals are multiplied.

In the multiplex circuits 103-1 to 103-N, the calibration signals output from the power level variable circuits 109-1 to 109-N are multiplied by the signals received at the antenna elements 102-1 to 102-N in a radio band, and are output to the radio receiving sections 104-1 to 104-N.

Here, there is no limitation on a multiplexing method in the multiplex circuits 103-1 to 103-N, and for example, code multiplexing is given. In case of the code multiplexing, a power adder that operates in a radio band can be used for the multiplex circuits 103-1 to 103-N. Also, it is preferable to use a directional coupler for the multiplex circuits 103-1 to 103-N so that the calibration signals are not radiated from the antenna elements. Also, the calibration signals multiplied at the multiplex circuits 103-1 to 103-N can be extracted.

The radio receiving sections 104-1 to 104-N are constructed of a low-noise amplifier, a band-limitation filter, a mixer, a local dial device, an AGC (Auto Gain Controller), a quadrature detector, a low band pass filter, an analog/digital converter and so forth. Here, in the radio receiving section 104-N for example, a signal output from the multiplex circuit 103-N is input thereto, and amplification, frequency conversion from a radio band to a base band, quadrature detection, analog/digital conversion and so forth of the input signal are conducted, and the signal is output to the user signal processing sections 105-1 to 105-M and the signal processing section 106 for calibration.

Here, there is no limitation on an arrangement of the radio receiving sections 104-1 to 104-N, and however, generally, to make power levels of output signals constant independent of power levels of input signals, an AGC that is anon-linear circuit is used for each of the radio receiving sections 104-1 to 104-N.

In the user signal processing sections 105-1 to 105-M, the signals output from the radio receiving sections 104-1 to 104-N and the amplitude and phase information detected at the signal processing section 106 for calibration are input thereto, and the signals output from the radio receiving sections 104-1 to 104-N are corrected based on the amplitude and phase information detected at the signal processing section 106 for calibration, and thereby, a reception directivity pattern is formed such that, for each user, a reception gain is increased for a direction along which a user signal comes, and a reception gain is decreased for interference from other users and interference due to a delay wave, and demodulation signals received by means of the reception directivity pattern are output.

Here, in the user signal processing sections 105-1 to 105-N, there is no limitation on their arrangements, algorithm for forming the reception directivity pattern, and a method of conducting a correction to the signals output from the radio receiving sections 104-1 to 104-N by using the amplitude and phase information detected at the signal processing section 106 for calibration. By conducting this correction, even in case that an amplitude and phase of the reception signals inside the radio receiving sections 104-1 to 104-N change when the array antenna receiving apparatus operates, amplitude and phase variation components which occur inside the respective radio receiving sections 104-1–104-N can be removed from the signals input to the user signal processing sections 105-1 to 105-M, and it becomes possible to exactly distinguish the respective signal components from each other, which come from different directions, and to form a reception directivity pattern.

In the signal processing section 106 for calibration, signals output from the radio receiving sections 104-1 to 104-N are input thereto, and calibration signals are extracted from the input signals, and thereby, amplitude and phase information of the signals received at the antenna elements 102-1 to 102-N is detected. The detected amplitude and phase information is output to the signal processing sections 105-1 to 105-M. Here, the amplitude and phase information of the signals received at the antenna elements 102-1 to 102-N is detected by investigating variation quantity of amplitude and phase of the calibration signals in the radio receiving sections 104-1 to 104-N. Also, based on power levels of the signals output from the radio receiving sections 104-1 to 104-N, control signals for controlling power of the calibration signals input to the multiplex circuits 103-1 to 103-N are output to the power level variable circuits 109-1 to 109-N so that a ratio of power levels of the signals output from the radio receiving sections 104-1 to 104-N and power levels of the calibration signals input to the multiplex circuits 103-1 to 103-N is made constant.

Here, during an operation of the array antenna receiving apparatus, the power levels of the signals to be output are automatically controlled by means of the AGC within each of the radio receiving sections 104-1 to 104-N so as to become constant independent of the power levels of the signals to be input to the radio receiving sections 104-1 to 104-N. Accordingly, the power levels of the calibration signals included in the signals output from the respective radio receiving sections 104-1 to 104-N become constant, and amplitude and phase variations of the calibration signals in the respective radio receiving sections 104-1 to 104-N can be exactly detected in the calibration signal processing section 106, and in association therewith, amplitude and phase information of the signals received at the antenna elements 102-1 to 102-N can be exactly detected.

In case that an amplitude and phase of the reception signals change inside the respective radio receiving sections 104-1 to 104-N in the operation, calibration signals are extracted from the signals output from the respective radio receiving sections 104-1 to 104-N, and the extracted calibration signals are compared with the calibration signals to be input to the multiplex circuits 103-1 to 103-N, and based on a comparison result, amplitude and phase information of the calibration signals in the respective radio receiving sections 104-1 to 104-N is detected, and based on a result of this detection, amplitude and phase information of the signals received at the antenna elements 102-1 to 102-N is detected.

Also, in case that the AGCs within the radio receiving sections 104-1 to 104-N normally operate, since the power levels of the signals output from the respective radio receiving sections 104-1 to 104-N are constant, there is also a method in which control signals are output to the power level variable circuits 109 so that the power levels of the calibration signals extracted from the signals output from the radio receiving sections 104-1 to 104-N are made constant.

Further, in the signal processing section 106 for calibration, when a ratio of the power levels of the signals output from the radio receiving sections 104-1 to 104-N and the power levels of the calibration signals extracted from the signals output from the radio receiving sections 104-1 to 104-N is calculated, bit error rate (BER: Bit Error Rate) information of the calibration signals extracted from the signals output from the radio receiving sections 104-1 to 104-N can be also used.

Since the calibration signal is known, it is possible to measure a BER of the calibration signals in the signal processing section 106 for calibration. In case that the BER is large, it is shown that, compared with the power levels of the signals output from the radio receiving sections 104-1 to 104-N, the power levels of the calibration signals extracted from the signals output from the radio receiving sections 104-1 to 104-N are smaller, and also, in case that the BER is small, it is shown that, compared with the power levels of the signals output from the radio receiving sections 104-1 to 104-N, the power levels of the calibration signals extracted from the signals output from the radio receiving sections 104-1 to 104-N are larger. Therefore, based on the bit error rate information of the calibration signals extracted from the signals output from the radio receiving sections 104-1 to 104-N, a ratio of the power levels of the signals output from the radio receiving sections 104-1 to 104-N and the power levels of the calibration signals extracted from the signals output from the radio receiving sections 104-1 to 104-N can be approximately calculated.

In the signal generator 107 for calibration, calibration signals are generated in a base band, and the generated calibration signals are output to the radio transmitting section 108 for calibration.

In the radio transmitting section 108 for calibration, the calibration signals in the base band, which were output from the signal generator 107 for calibration, are input thereto, and digital/analog conversion, frequency conversion from a base band to a radio band and so forth are applied to the input calibration signals, and these calibration signals are output to the power level variable circuits 109 as calibration signals having a frequency band same as the signals received at the antenna elements 102-1 to 102-N.

In the power level variable circuits 109-1 to 109-N, the calibration signals output from the radio transmitting section 108 for calibration are output to the multiplex circuits 103-1 to 103-N at power levels based on the control signals output from the signal processing section 106 for calibration.

In the array antenna receiving apparatus arranged as described above, since the calibration signals having power levels in accordance with the power levels of the signals received at the respective antenna elements 102-1–102-N are supplied to the respective radio receiving sections 104-1 to 104-N, even though the power levels of the reception signals change in time, and the outputs are automatically controlled by means of the AGCs within the respective radio receiving sections 104-1 to 104-N so that a sum of the power levels of the reception signals and the power levels of the calibration signals become constant, the power levels of the calibration signals included in the signals output from the respective radio receiving sections 104-1 to 104-N can be kept constant, and in the signal processing section 106 for calibration, amplitude and phase variations of the calibration signals in the respective radio receiving sections 104-1 to 104-N can be exactly detected, and in association therewith, the amplitude and phase information of the signals received at the antenna elements 102-1 to 102-N is exactly detected. Thereby, calibration can be conducted with high accuracy even in an operation.

The Second Embodiment

Figure 2:
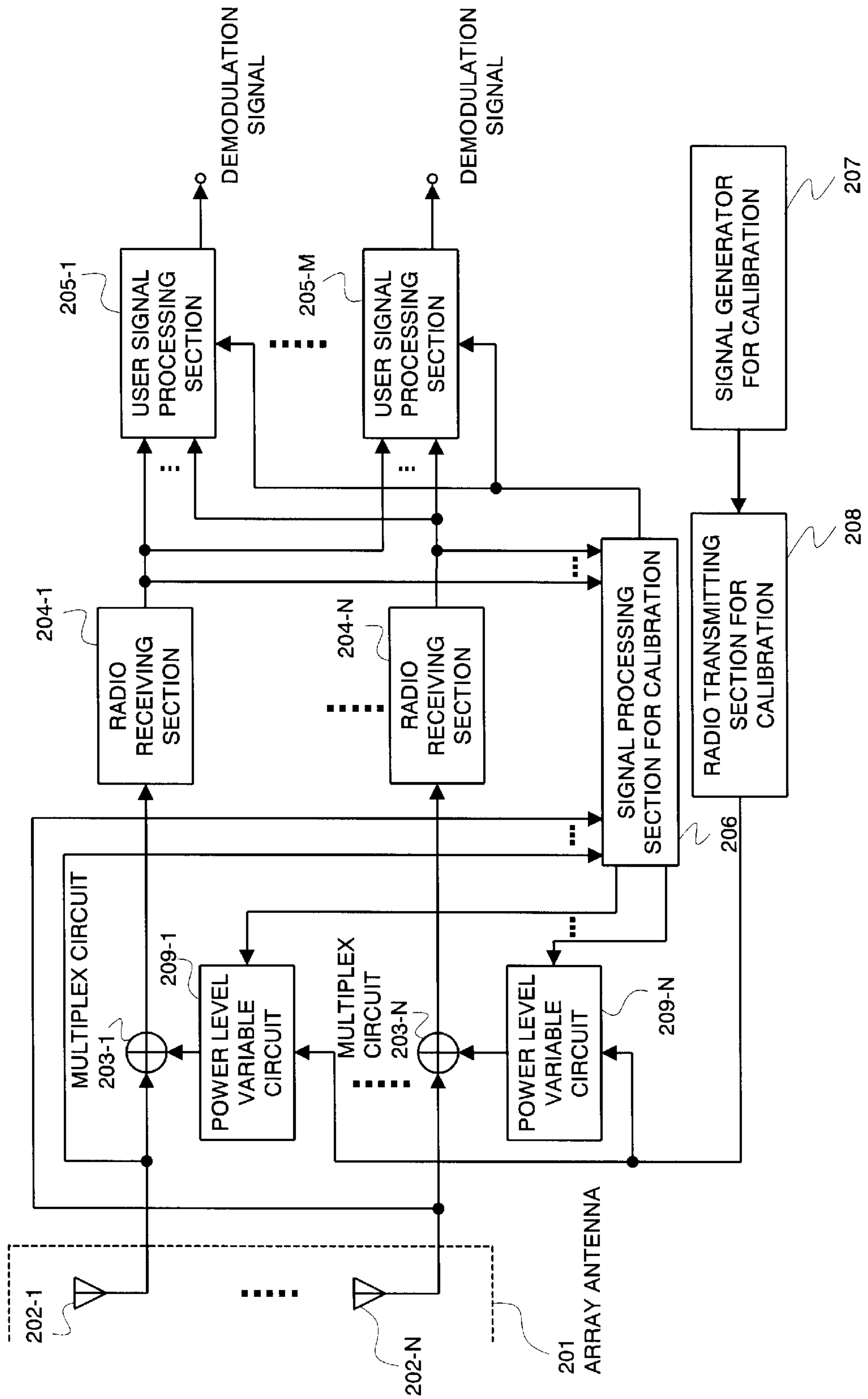
FIG. 2 is a block diagram showing the second embodiment of the array antenna receiving apparatus of the present invention.

FIG. 2 is a block diagram showing the second embodiment of an array antenna receiving apparatus of the present invention.

As shown in FIG. 2, this embodiment is constructed of an array antenna 201 consisting of a plurality of antenna elements 202-1 to 202-N, multiplex circuits 203-1 to 203-N for multiplying calibration signals by signals received at the antenna elements 202-1 to 202-N and outputting them, which are provided in accordance with the antenna elements 202-1 to 202-N, respectively, radio receiving sections 204-1 to 204-N for conducting reception processing of signals output from the multiplex circuits 203-1 to 203-N, which are provided in accordance with the antenna elements 202-1 to 202-N, respectively, a signal processing section 206 for calibration, to which the signals received at the antenna elements 202-1 to 202-N and signals output from the radio receiving sections 204-1 to 204-N are input, and which detects amplitude information and phase information of the signals received at the antenna elements 202-1 to 202-N based on the signals output from the radio receiving sections 204-1 to 204-N, user signal processing sections 205-1 to 205-M, provided by the number of users, for correcting the signals output from the radio receiving sections 204-1 to 204-N using the amplitude information and phase information detected at the signal processing section 206 for calibration, and outputting them as demodulation signals for every user, a signal generator 207 for calibration, which generates calibration signals, a radio transmitting section 208 for calibration, which applies frequency conversion to the calibration signals generated at the signal generator 207 for calibration, and outputting them, and power level variable circuits 209-1 to 209-N for outputting the calibration signals output from the radio transmitting section 208 for calibration at power levels which are controlled at the signal processing section 206 for calibration, and the calibration signals output from the power level variable circuits 209-1 to 209-N are multiplied by the signals received at the antenna elements 202-1 to 202-N in the multiplex circuits 203-1 to 203-N.

As mentioned above, this embodiment is the same as the first embodiment other than the signal processing section 206 for calibration.

In the signal processing section 206 for calibration, the signals received at the antenna elements 202-1 to 202-N and the signals output from the radio receiving sections 204-1 to 204-N are input thereto, and calibration signals are extracted from the signals output from the radio receiving sections 204-1 to 204-N, and thereby, amplitude and phase information of the signals received at the antenna elements 202-1 to 202-N is detected. The detected amplitude and phase information is output to the user signal processing sections 205-1 to 205-N. Here, the amplitude and phase information of the signals received at the antenna elements 202-1 to 202-N is detected by investigating variation quantity of amplitude and phase of the calibration signals in the radio receiving sections 204-1 to 204-N. Also, based on the signals received at the antenna elements 202-1 to 202-N, control signals for controlling power of the calibration signals input to the multiplex circuits 203-1 to 203-N are output to the power level variable circuits 209-1 to 209-N so that a ratio of power levels of the signals received at the antenna elements 202-1 to 202-N and power levels of the calibration signals input to the multiplex circuits 203-1 to 203-N is made constant.

Here, since to make the ratio of the power levels of the signals received at the antenna elements 202-1 to 202-N and the power levels of the calibration signals input to the multiplex circuits 203-1 to 203-N constant means to make a rate of power of the calibration signals included in the signals output from the multiplex circuits 203-1 to 203-N constant, the power levels of the calibration signals included in the signals output from the respective radio receiving sections 204-1 to 204-N are made constant. From this, it is understood that this embodiment is the same as the first embodiment in principle.

In the array antenna apparatus arranged as described above, while in the first embodiment the power levels of the signals output from the radio receiving sections are measured, and based on these power levels, power of the calibration signals to be input to the multiplex circuits is controlled, the power levels of the reception signals in the antenna elements 202-1 to 202-1 are measured, and based on these power levels, power of the calibration signals to be input to the multiplex circuits 203-1 to 203-N is controlled, and accordingly, information before the signals received at the antenna elements 202-1 to 202-N are multiplied by the calibration signals can be used in the multiplex circuits 203-1 to 203-N, and calibration can be conducted with higher accuracy.

The Third Embodiment

Figure 3:
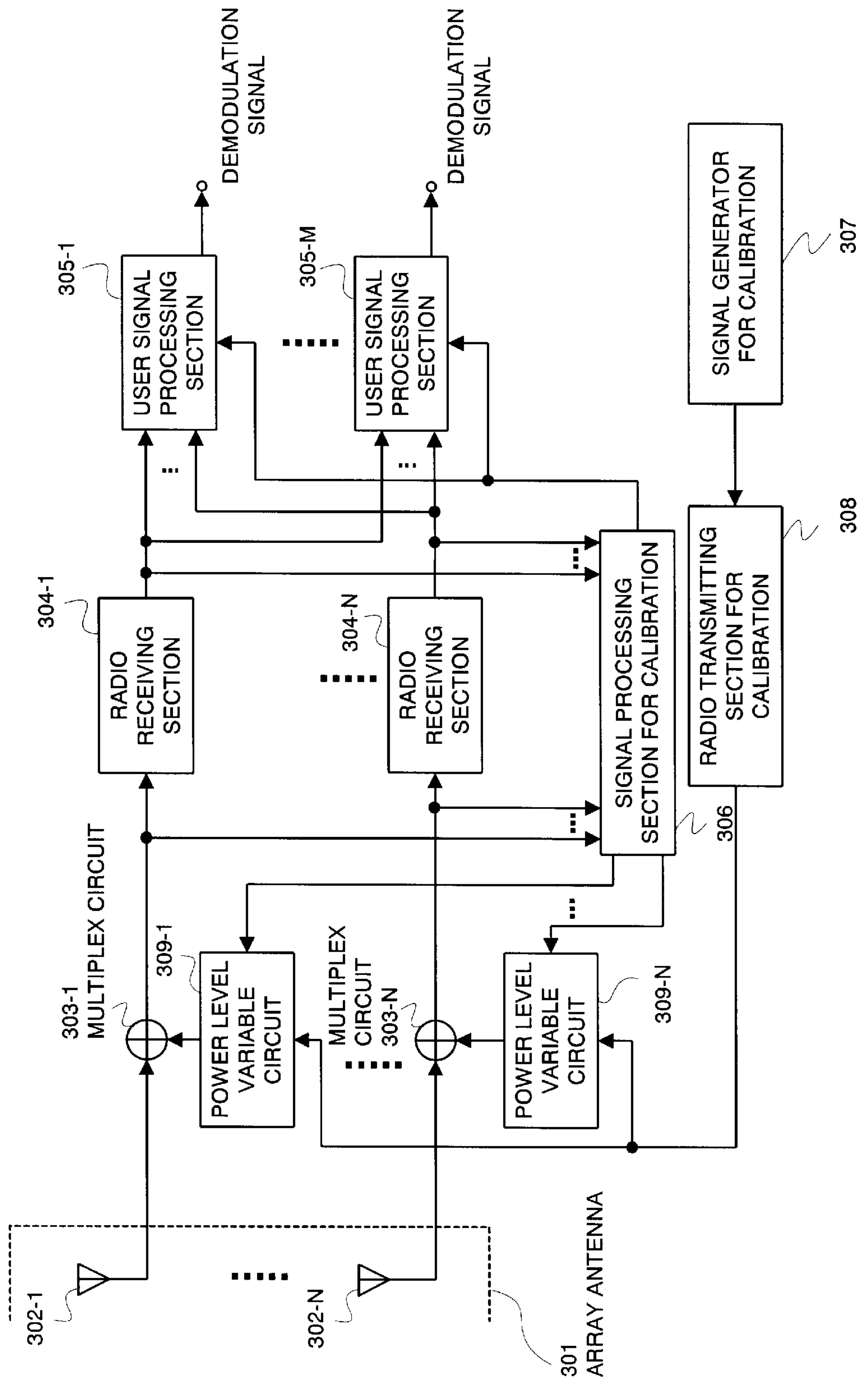
FIG. 3 is a block diagram showing the third embodiment of the array antenna receiving apparatus of the present invention.

FIG. 3 is a block diagram showing the third embodiment of an array antenna receiving apparatus of the present invention.

As shown in FIG. 3, this embodiment is constructed of an array antenna 301 consisting of a plurality of antenna elements 302-1 to 302-N, multiplex circuits 303-1 to 303-N for multiplying calibration signals by signals received at the antenna elements 302-1 to 302-N and outputting them, which are provided in accordance with the antenna elements 302-1 to 302-N, respectively, radio receiving sections 304-1 to 304-N for conducting reception processing of signals output from the multiplex circuits 303-1 to 303-N, which are provided in accordance with the antenna elements 302-1 to 302-N, respectively, a signal processing section 306 for calibration, to which the signals output from the multiplex circuits 303-1 to 303-N and signals output from the radio receiving sections 304-1 to 304-N are input, and which detects amplitude information and phase information of the signals received at the antenna elements 302-1 to 302-N based on the signals output from the radio receiving sections 304-1 to 304-N, user signal processing sections 305-1 to 305-M, provided by the number of users, for correcting the signals output from the radio receiving sections 304-1 to 304-N using the amplitude information and phase information detected at the signal processing section 306 for calibration, and outputting them as demodulation signals for every user, a signal generator 307 for calibration, which generates calibration signals, a radio transmitting section 308 for calibration, which applies frequency conversion to the calibration signals generated at the signal generator 307 for calibration, and outputting them, and power level variable circuits 309-1 to 309-N for outputting the calibration signals output from the radio transmitting section 308 for calibration at power levels which are controlled at the signal processing section 306 for calibration, and the calibration signals output from the power level variable circuits 309-1 to 309-N are multiplied by the signals received at the antenna elements 302-1 to 302-N in the multiplex circuits 303-1 to 303-N.

As mentioned above, this embodiment is the same as the first embodiment other than the signal processing section 306 for calibration.

In the signal processing section 306 for calibration, the signals output from the multiplex circuits 303-1 to 303-N and the signals output from the radio receiving sections 304-1 to 304-N are input thereto, and calibration signals are extracted from the signals output from the radio receiving sections 304-1 to 304-N, and thereby, amplitude and phase information of the signals received at the antenna elements 302-1 to 302-N is detected. The detected amplitude and phase information is output to the user signal processing sections 305-1 to 305-N. Here, the amplitude and phase information of the signals received at the antenna elements 302-1 to 302-N is detected by investigating variation quantity of amplitude and phase of the calibration signals in the radio receiving sections 304-1 to 304-N. Also, based on the power levels of the signals output from the multiplex circuits 303-1 to 303-N, control signals for controlling power of the calibration signals to be input to the multiplex circuits 303-1 to 303-N are output to the power level variable circuits 309-1 to 309-N so that a ratio of the power levels of the signals output from the multiplex circuits 303-1 to 303-N and the power levels of the calibration signals input to the multiplex circuits 303-1 to 303-N is made constant.

Here, since the power levels of the signals received at the respective antenna elements 302-1 to 302-N can be calculated by subtracting the power levels of the calibration signals input to the multiplex circuits 303-1 to 303-N from the power levels of the signals output from the multiplex circuits 303-1 to 303-N, it is understood that this embodiment is the same as the second embodiment in principle.

In the array antenna receiving apparatus arranged as described above, while in the second embodiment the power levels of the signals received at the respective antenna elements are measured, and based on these power levels, power of the calibration signals to be input to the multiplex circuits is controlled, the power levels of the signals output from the multiplex circuits 303-1 to 303-N, that is, the power levels of the input signals in the respective radio receiving sections 304-1 to 304-N are measured, and based on these power levels, power of the calibration signals to be input to the multiplex circuits 303-1 to 303-N is controlled.

Here, like in that shown in the second embodiment, in order to measure the power levels of the signals received at the respective antenna elements, it is necessary to measure power levels between the outputs of the respective antenna elements and the inputs of the multiplex circuits. However, usually, there are many cases where the antenna elements and the multiplex circuits are installed at a place apart from the radio receiving sections, and in the second embodiment, there is a possibility that an error due to dispersion of characteristics of N measurement cables corresponding to the number of the antenna elements occurs.

On the contrary, in this embodiment, since an object to be measured is the power levels of the input signals in the respective radio receiving sections, it is possible to shorten length of the measurement cables and to suppress dispersion of the characteristics.

The Fourth Embodiment

Figure 4:
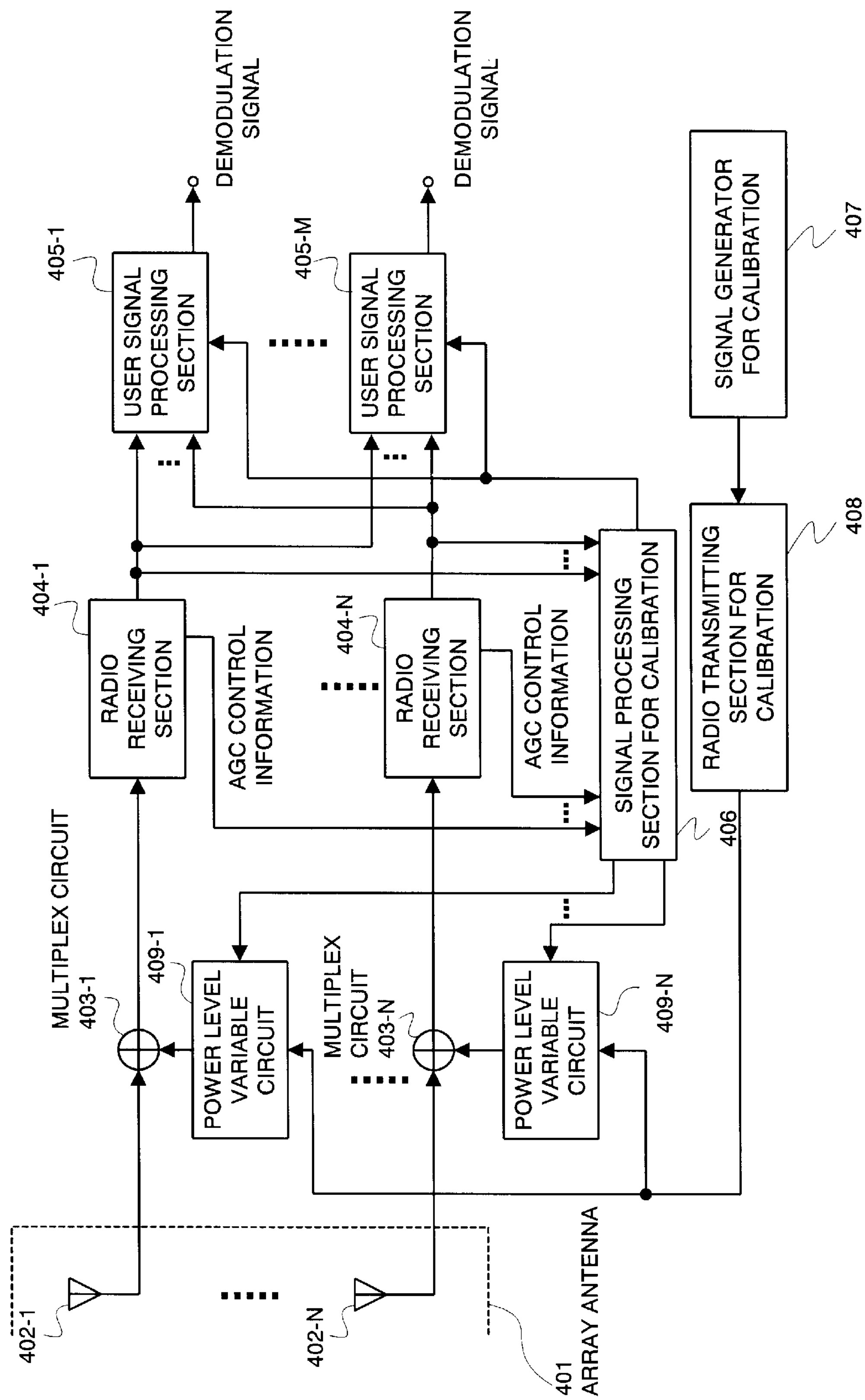
FIG. 4 is a block diagram showing the fourth embodiment of the array antenna receiving apparatus of the present invention.

FIG. 4 is a block diagram showing the fourth embodiment of an array antenna receiving apparatus of the present invention.

As shown in FIG. 4, this embodiment is constructed of an array antenna 401 consisting of a plurality of antenna elements 402-1 to 402-N, multiplex circuits 403-1 to 403-N for multiplying calibration signals by signals received at the antenna elements 402-1 to 402-N and outputting them, which are provided in accordance with the antenna elements 402-1 to 402-N, respectively, radio receiving sections 404-1 to 404-N including AGCs (Auto Gain Controllers) that are automatic gain controlling means, for conducting reception processing of signals output from the multiplex circuits 403-1 to 403-N and outputting amplification factors in the AGCs as AGC control information, which are provided in accordance with the antenna elements 402-1 to 402-N, respectively, a signal processing section 406 for calibration, to which the AGC control information output from the radio receiving sections 404-1 to 404-N and signals output from the radio receiving sections 404-1 to 404-N are input, and which detects amplitude information and phase information of the signals received at the antenna elements 402-1 to 402-N based on the signals output from the radio receiving sections 404-1 to 404-N, user signal processing sections 405-1 to 405-M, provided by the number of users, for correcting the signals output from the radio receiving sections 404-1 to 404-N using the amplitude information and phase information detected at the signal processing section 406 for calibration, and outputting them as demodulation signals for every user, a signal generator 407 for calibration, which generates calibration signals, a radio transmitting section 408 for calibration, which applies frequency conversion to the calibration signals generated at the signal generator 407 for calibration, and outputting them, and power level variable circuits 409-1 to 409-N for outputting the calibration signals output from the radio transmitting section 408 for calibration at power levels which are controlled at the signal processing section 406 for calibration, and the calibration signals output from the power level variable circuits 409-1 to 409-N are multiplied by the signals received at the antenna elements 402-1 to 402-N in the multiplex circuits 403-1 to 403-N.

As mentioned above, this embodiment is the same as the first embodiment other than the radio receiving sections 404-1 to 404-N and the signal processing section 406 for calibration.

The radio receiving sections 404-1 to 404-N are constructed of a low-noise amplifier, a band-limitation filter, a mixer, a local dial device, an AGC (Auto Gain Controller), a quadrature detector, a low band pass filter, an analog/digital converter and so forth. Here, in the radio receiving section 404-N for example, a signal output from the multiplex circuit 403-N is input thereto, and amplification, frequency conversion from a radio band to a base band, quadrature detection, analog/digital conversion and so forth of the input signal are conducted, and the signal is output to the user signal processing sections 405-1 to 405-M and the signal processing section 406 for calibration. Also, AGC amplification factors in the AGCs provided within the respective radio receiving sections 404-1 to 404-N are output to the signal processing section 406 for calibration as control information.

In the signal processing section 406 for calibration, the AGC control information output from the radio receiving sections 404-1 to 404-N and the signals output from the radio receiving sections 404-1 to 404-N are input thereto, and calibration signals are extracted from the signals output from the radio receiving sections 404-1 to 404-N, and thereby, amplitude and phase information of the signals received at the antenna elements 402-1 to 402-N is detected, and the detected amplitude and phase information is output to the user signal processing sections 405-1 to 405-N. Also, based on power levels of the signals output from the radio receiving sections 404-1 to 404-N and the AGC control information output from the radio receiving sections 404-1 to 404-N, power levels of signals to be input to the radio receiving sections 404-1 to 404-N are approximately calculated, and control signals for controlling power of the calibration signals to be input to the multiplex circuits 403-1 to 403-N are output to the power level variable circuits 409-1 to 409-N so that a ratio of the power levels of the signals input to the radio receiving sections 404-1 to 404-N and the power levels of the calibration signals input to the radio receiving sections 404-1 to 404-N is made constant.

Here, since the AGC control information output from the radio receiving sections 404-1 to 404-N is information such that, in accordance with the power levels of the signals to be input to the radio receiving sections 404-1 to 404-N, in case that the input power levels are small, amplification factors of the AGCs are increased, and in case that the input power levels are large, the amplification factors of the AGCs are decreased, based on the power levels of the signals and the AGC control information which were output from the radio receiving sections 404-1 to 404-N, the power levels of the signals to be input to the radio receiving sections 404-1 to 404-N can be approximately calculated. In principle, this embodiment is the same as the third embodiment.

In the array antenna receiving apparatus arranged as described above, while in the third embodiment the output power levels of the multiplex circuits, that is, the power levels of the signals to be input to the respective radio receiving sections are measured, and based on these power levels, power of the calibration signals to be input to the multiplex circuits is controlled, only the AGC control information output from the radio receiving sections 404-1 to 404-N is used. Since this AGC control information is a base band signal, a load of the signal processing section for calibration can be reduced compared with the third embodiment in which the input signals of the respective radio receiving sections are handled, which are direct radio band signals.

The Fifth Embodiment

Figure 5:
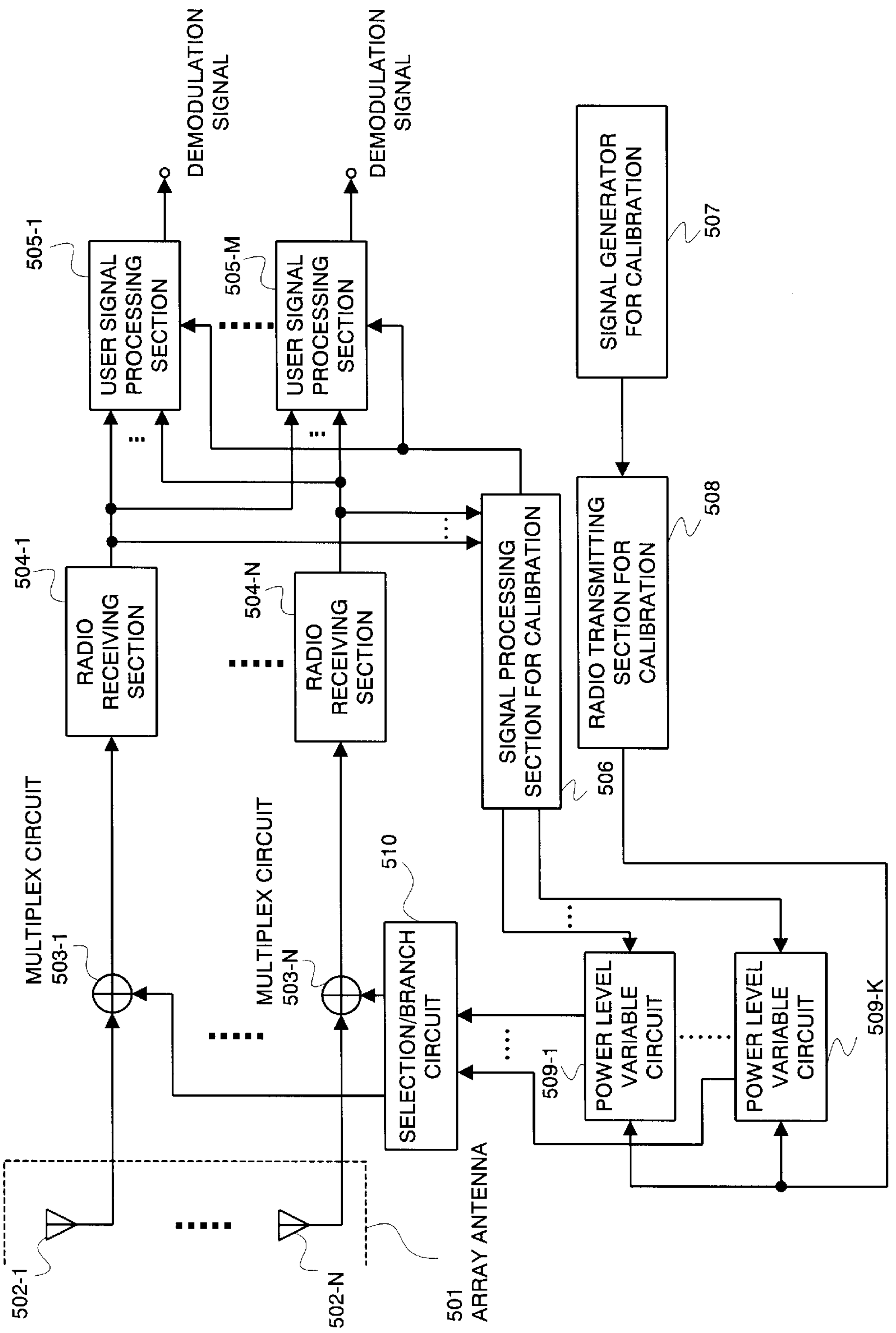
FIG. 5 is a block diagram showing the fifth embodiment of the array antenna receiving apparatus of the present invention.
Figure 6:
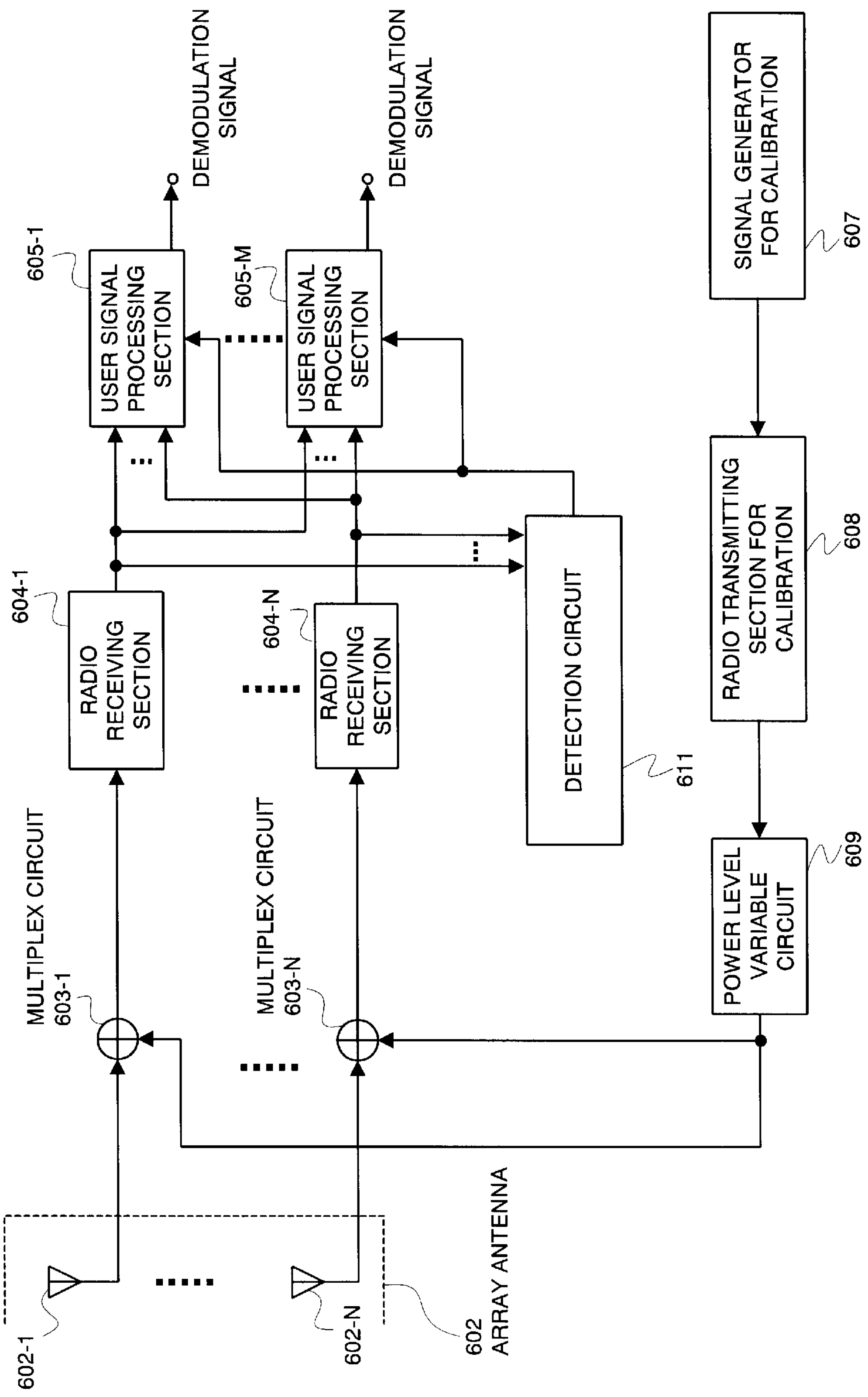
FIG. 6 is a block diagram showing one arrangement example of the conventional array antenna receiving apparatus.

FIG. 5 is a block diagram showing the fifth embodiment of an array antenna receiving apparatus of the present invention.

As shown in FIG. 5, this embodiment is constructed of an array antenna 501 consisting of a plurality of antenna elements 502-1 to 502-N, multiplex circuits 503-1 to 503-N for multiplying calibration signals by signals received at the antenna elements 502-1 to 502-N and outputting them, which are provided in accordance with the antenna elements 502-1 to 502-N, respectively, radio receiving sections 504-1 to 504-N for conducting reception processing of signals output from the multiplex circuits 503-1 to 503-N, which are provided in accordance with the antenna elements 502-1 to 502-N, respectively, a signal processing section 506 for calibration, to which the signals output from the radio receiving sections 504-1 to 504-N are input, and which detects amplitude information and phase information of the signals received at the antenna elements 502-1 to 502-N based on the input signals, user signal processing sections 505-1 to 505-M, provided by the number of users, for correcting the signals output from the radio receiving sections 504-1 to 504-N using the amplitude information and phase information detected at the signal processing section 506 for calibration, and outputting them as demodulation signals for every user, a signal generator 507 for calibration, which generates calibration signals, a radio transmitting section 508 for calibration, which applies frequency conversion to the calibration signals generated at the signal generator 507 for calibration, and outputting them, K (K is an integer more than or equal to 1 and less than N) power level variable circuits 509-1 to 509-K for outputting the calibration signals output from the radio transmitting section 508 for calibration at power levels which are controlled at the signal processing section 506 for calibration, which are provided by the number less than the antenna elements 502-1 to 502-N, and a selection/branch circuit 510 for selecting the calibration signals output from the power level variable circuits 509-1 to 509-K, making them branch, and outputting them, and the calibration signals output from the selection/branch circuit 510 are multiplied by the signals received at the antenna elements 502-1 to 502-N in the multiplex circuits 503-1 to 503-N.

As mentioned above, this embodiment is the same as the first embodiment other than the power level variable circuits 509-1 to 509-K and the selection/branch circuit 510.

In the power level variable circuits 509-1 to 509-K, the calibration signals output from the radio transmitting section 508 for calibration and having a frequency band same as the signals received at the antenna elements 502-1 to 502-N are input thereto, and these calibration signals are output to the selection/distribution circuit 510 at arbitrary power levels based on control of the signal processing section 506 for calibration.

In the selection/distribution circuit 510, the calibration signals output from the power level variable circuits 509-1 to 509-K are input thereto, and selection and distribution of these calibration signals are conducted, and they are output to the multiplex circuits 503-1 to 503-N.

In addition, there is no limitation on the number of the selection and distribution and a manner of connection in the selection/distribution circuit 510. Particularly, an arrangement by means of one power level variable circuit and one input and N outputs distributor can be given.

Although, in FIG. 5, an example corresponding to that shown in the first embodiment is given, this embodiment can be applied to the second to fourth embodiments in the same manner.

In the array antenna receiving apparatus arranged as described above, by using the power level variable circuits having the number less than the number of the antenna elements, compared with the arrangements shown in the first to fourth embodiments, the arrangement of the array antenna receiving apparatus can be simplified.

By arbitrarily combining the above-mentioned first to fourth embodiments, it is possible to improve accuracy of the power levels of the calibration signals in accordance with the power levels of the signals received at the respective antenna elements, and those are also included in the present invention. In addition, there is no limitation on the combination of the embodiments.

Also, in the present invention, there is no limitation on a radio transmission method, and for example, a code division multiplex coupling (CDMA) method can be given.

Also, in the present invention, there is no limitation on the element number of the antenna and the placement of the antenna elements, and as an example of the placement of the antenna elements, a straight line placement having a half wavelength interval of a carrier wave can be given.

Also, in the present invention, there is no limitation on the number of users who concurrently conduct reception, and the number of multi-paths per user who concurrently conducts reception.

Also, in the present invention, there is no limitation on an arrangement of the user signal processing sections, algorithm for forming a reception directivity pattern, and a method of conducting correction to the outputs of the respective radio receiving sections by using amplitude and phase information in the individual antenna elements.

As explained above, in the present invention, since an arrangement is adopted, in which the calibration signals to be multiplied by the signals received at the antenna elements are multiplied by the signals received at the antenna elements at the power levels such that the power levels of the calibration signals extracted from the signals output from the radio receiving section become constant, even in case that the power levels of the signals received at the antenna elements change in time, and in the radio receiving sections, output thereof are automatically controlled so that a sum of the power levels of the signals received at the antenna elements and the power levels of the calibration signals become constant, calibration can be conducted with high accuracy.

What is claimed is:

1. An array antenna receiving apparatus comprising:

an array antenna consisting of N antenna elements,

N radio receiving sections for conducting reception processing of signals received at said antenna elements, calibration means for multiplying calibration signals by the signals received at said antenna elements, extracting said calibration signals from signals output from said radio receiving sections, and detecting amplitude and phase information of the signals received at said antenna elements based on the extracted calibration signals, and M user signal processing sections for correcting the signals output from said radio receiving sections based on the amplitude and phase information detected at said calibration means, and outputting them as demodulation signals;

wherein said calibration means multiplies said calibration signals by the signals received at said antenna elements at power levels determined based on power levels of the signals output from said radio receiving sections.

2. An array antenna receiving apparatus recited in claim 1, wherein said calibration means comprises:

N multiplex circuits for multiplying calibration signals by the signals received at said antenna elements;

a signal generator for calibration, which generates said calibration signals;

a signal radio transmitting section for calibration, which applies frequency conversion to the calibration signals generated at said signal generator for calibration and outputs the calibration signals having a frequency band same as a frequency of the signals received at said antenna elements;

a signal processing section for calibration, which extracts said calibration signals from the signals output from said radio receiving sections, detects amplitude and phase information of the signals received at said antenna elements based on the extracted calibration signals, and outputs control signals for controlling power levels of said calibration signals based on power levels of the signals output from said radio receiving sections; and N power level variable circuits for outputting the calibration signals output from said signal radio transmitting section for calibration at power levels based on the control signals output from said signal processing section for calibration, and the calibration signals output from said power level variable circuits are multiplied by the signals received at said antenna elements in said multiplex circuits.

3. An array antenna receiving apparatus recited in claim 2, wherein said signal processing section for calibration comprises means for outputting the control signals such that the power levels of the calibration signals extracted from the signals output from said radio receiving sections becomes to be constant.

4. An array antenna receiving apparatus recited in claim 3, wherein said signal processing section for calibration comprises means for recognizing a ratio of the signals output from said radio receiving sections and the calibration signals extracted from said signals using a bit error rate of the calibration signals extracted from the signals output from said radio receiving sections.

5. An array antenna receiving apparatus recited in claim 1, wherein said calibration means comprises:

N multiplex circuits for multiplying calibration signals by the signals received at said antenna elements;

a signal generator for calibration, which generates said calibration signals;

a signal radio transmitting section for calibration, which applies frequency conversion to the calibration signals generated at said signal generator for calibration and outputs the calibration signals having a frequency band same as a frequency of the signals received at said antenna elements;

a signal processing section for calibration, which extracts said calibration signals from the signals output from said radio receiving sections, detects amplitude and phase information of the signals received at said antenna elements based on the extracted calibration signals, and outputs control signals for controlling power levels of said calibration signals based on power levels of the signals output from said radio receiving sections;

K power level variable circuits for outputting the calibration signals output from said signal radio transmitting section for calibration at power levels based on the control signals output from said signal processing section for calibration; and a selection and branch circuit for selecting the calibration signals output from said power level variable circuits, and distributing and outputting them to said N multiplex circuits, and the calibration signals output from said selection and branch circuits are multiplied by the signals received at said antenna elements in said multiplex circuits.

6. An array antenna receiving apparatus recited in claim 5, wherein said signal processing section for calibration comprises means for outputting the control signals such that the power levels of the calibration signals extracted from the signals output from said radio receiving sections becomes to be constant.

7. An array antenna receiving apparatus recited in claim 6, wherein said signal processing section for calibration comprises means for recognizing a ratio of the signals output from said radio receiving sections and the calibration signals extracted from said signals using a bit error rate of the calibration signals extracted from the signals output from said radio receiving sections.

8. An array antenna receiving apparatus comprising:

an array antenna consisting of N antenna elements,

N radio receiving sections for conducting reception processing of signals received at said antenna elements, calibration means for multiplying calibration signals by the signals received at said antenna elements, extracting said calibration signals from signals output from said radio receiving sections, and detecting amplitude and phase information of the signals received at said antenna elements based on the extracted calibration signals, and M user signal processing sections for correcting the signals output from said radio receiving sections based on the amplitude and phase information detected at said calibration means, and outputting them as demodulation signals;

wherein said calibration means multiplies said calibration signals by the signals received at said antenna elements at power levels determined based on power levels of the signals received at said antenna elements.

9. An array antenna receiving apparatus recited in claim 8, wherein said calibration means comprises:

N multiplex circuits for multiplying calibration signals by the signals received at said antenna elements;

a signal generator for calibration, which generates said calibration signals;

a signal radio transmitting section for calibration, which applies frequency conversion to the calibration signals generated at said signal generator for calibration and outputs the calibration signals having a frequency band same as a frequency of the signals received at said antenna elements;

a signal processing section for calibration, which extracts said calibration signals from the signals output from said radio receiving sections, detects amplitude and phase information of the signals received at said antenna elements based on the extracted calibration signals, and outputs control signals for controlling power levels of said calibration signals based on power levels of the signals received at said antenna elements; and N power level variable circuits for outputting the calibration signals output from said signal radio transmitting section for calibration at power levels based on the control signals output from said signal processing section for calibration, and the calibration signals output from said power level variable circuits are multiplied by the signals received at said antenna elements in said multiplex circuits.

10. An array antenna receiving apparatus recited in claim 9, wherein said signal processing section for calibration comprises means for outputting the control signals such that a ratio of the power levels of the signals received at said antenna elements and the power levels of the calibration signals output from said power level variable circuits becomes to be constant.

11. An array antenna receiving apparatus recited in claim 8, wherein said calibration means comprises:

N multiplex circuits for multiplying calibration signals by the signals received at said antenna elements;

a signal generator for calibration, which generates said calibration signals;

a signal radio transmitting section for calibration, which applies frequency conversion to the calibration signals generated at said signal generator for calibration and outputs the calibration signals having a frequency band same as a frequency of the signals received at said antenna elements;

a signal processing section for calibration, which extracts said calibration signals from the signals output from said radio receiving sections, detects amplitude and phase information of the signals received at said antenna elements based on the extracted calibration signals, and outputs control signals for controlling power levels of said calibration signals based on power levels of the signals received at said antenna elements;

K power level variable circuits for outputting the calibration signals output from said signal radio transmitting section for calibration at power levels based on the control signals output from said signal processing section for calibration; and a selection and branch circuit for selecting the calibration signals output from said power level variable circuits, and distributing and outputting them to said N multiplex circuits, and the calibration signals output from said selection and branch circuits are multiplied by the signals received at said antenna elements in said multiplex circuits.

12. An array antenna receiving apparatus recited in claim 11, wherein said signal processing section for calibration comprises means for outputting the control signals such that a ratio of the power levels of the signals received at said antenna elements and the power levels of the calibration signals output from said power level variable circuits becomes to be constant.

13. An array antenna receiving apparatus comprising:

an array antenna consisting of N antenna elements,

N radio receiving sections for conducting reception processing of signals received at said antenna elements, calibration means for multiplying calibration signals by the signals received at said antenna elements, extracting said calibration signals from signals output from said radio receiving sections, and detecting amplitude and phase information of the signals received at said antenna elements based on the extracted calibration signals, and M user signal processing sections for correcting the signals output from said radio receiving sections based on the amplitude and phase information detected at said calibration means, and outputting them as demodulation signals;

Wherein said calibration means comprises;

N multiplex circuits for multiplying calibration signals by the signals received at said antenna elements, a signal generator for calibration, which generates said calibration signals, a signal radio transmitting section for calibration, which applies frequency conversion to the calibration signals generated at said signal generator for calibration and outputs the calibration signals having a frequency band same as a frequency of the signals received at said antenna elements, a signal processing section for calibration, which extracts said calibration signals from the signals output from said radio receiving sections, detects amplitude and phase information of the signals received at said antenna elements based on the extracted calibration signals, and outputs control signals for controlling power levels of said calibration signals based on power levels of the signals output from said multiplex circuits, and N power level variable circuits for outputting the calibration signals output from said signal radio transmitting section for calibration at power levels based on the control signals output from said signal processing section for calibration, and wherein the calibration signals output from said power level variable circuits are multiplied by the signals received at said antenna elements in said multiplex circuits.

14. An array antenna receiving apparatus recited in claim 13, wherein said signal processing section for calibration comprises means for outputting the control signals such that a ratio of the power levels of the signals output from said multiplex circuits and the power levels of the calibration signals output from said power level variable circuits becomes to be constant.

15. An array antenna receiving apparatus recited in claim 14, wherein said radio receiving section comprises automatic gain controlling means for keeping power levels of output signals constant independent of power levels of input signals, and said signal processing section for calibration comprises means for recognizing the power levels of the signals output from said multiplex circuits based on gain information in said automatic gain controlling means.

16. An array antenna receiving apparatus comprising:

an array antenna consisting of N antenna elements,

N radio receiving sections for conducting reception processing of signals received at said antenna elements, calibration means for multiplying calibration signals by the signals received at said antenna elements, extracting said calibration signals from signals output from said radio receiving sections, and detecting amplitude and phase information of the signals received at said antenna elements based on the extracted calibration signals, and M user signal processing sections for correcting the signals output from said radio receiving sections based on the amplitude and phase information detected at said calibration means, and outputting them as demodulation signals;

wherein said calibration means comprises;

N multiplex circuits for multiplying calibration signals by the signals received at said antenna elements, a signal generator for calibration, which generates said calibration signals, a signal radio transmitting section for calibration, which applies frequency conversion to the calibration signals generated at said signal generator for calibration and outputs the calibration signals having a frequency band same as a frequency of the signals received at said antenna elements, a signal processing section for calibration, which extracts said calibration signals from the signals output from said radio receiving sections, detects amplitude and phase information of the signals received at said antenna elements based on the extracted calibration signals, and outputs control signals for controlling power levels of said calibration signals based on power levels of the signals output from said multiplex circuits, K power level variable circuits for outputting the calibration signals output from said signal radio transmitting section for calibration at power levels based on the control signals output from said signal processing section for calibration; and a selection and branch circuit for selecting the calibration signals output from said power level variable circuits, and distributing and outputting them to said N multiplex circuits, and the calibration signals output from said selection and branch circuits are multiplied by the signals received at said antenna elements in said multiplex circuits.

17. An array antenna receiving apparatus recited in claim 16, wherein said signal processing section for calibration comprises means f or outputting the control signals such that a ratio of the power levels of the signals output from said multiplex circuits and the power levels of the calibration signals output from said power level variable circuits becomes to be constant.

18. An array antenna receiving apparatus recited in claim 17, wherein said radio receiving section comprises automatic gain controlling means f or keeping power levels of output signals constant independent of power levels of input signals, and said signal processing section for calibration comprises means for recognizing the power levels of the signals output from said multiplex circuits based on gain information in said automatic gain controlling means.

* * * * *